(12) United States Patent
Kim et al.

(10) Patent No.: US 7,190,898 B2
(45) Date of Patent: Mar. 13, 2007

(54) DYNAMIC WAVELENGTH MANAGEMENT METHOD IN OBS NETWORKS

(75) Inventors: Sungchang Kim, Daejeon (KR); Kyungsun Min, Daejeon (KR); Minho Kang, Daejeon (KR)

(73) Assignee: Information and Communications University Educational Foundation (KR)

( * ) Notice: Subject to any disclaimer, the term of this patent is extended or adjusted under 35 U.S.C. 154(b) by 607 days.

(21) Appl. No.: 10/338,243

(22) Filed: Jan. 7, 2003

(65) Prior Publication Data
US 2003/0138253 A1    Jul. 24, 2003

(30) Foreign Application Priority Data
Jan. 7, 2002    (KR) .................................. 2002-697

(51) Int. Cl.
   H04J 14/02    (2006.01)
   H04J 14/00    (2006.01)
(52) U.S. Cl. ............................. 398/51; 398/48; 398/49; 398/50
(58) Field of Classification Search ................ 398/55, 398/48, 51, 78; 370/395.4, 395.21
   See application file for complete search history.

(56) References Cited

U.S. PATENT DOCUMENTS 6,233,240 B1 * 5/2001 Barbas et al. .......... 370/395.62
6,804,255 B1 * 10/2004 Zheng et al. ................ 370/468
6,819,870 B1 * 11/2004 Ge et al. ...................... 398/51
2002/0141398 A1 * 10/2002 Qiao et al. .................. 370/360

OTHER PUBLICATIONS

"Local resource allocation for providing end to end delay guarantees in ATM networks using PGPS scheduling", Ayad, A.S.; Elsayed, K.M.F; El-Hadidi, M.T.; Modeling, Analysis and Simulation of Computer and Telecommunication Systems, 1999. Proceedings. 7th International Symposium on Oct. 24-28, 1999 pp. 30-37.*
"Supporting Multiple Classes of Service in IP over WDM Networks", Myungsik Yoo and Chunming Qiao, Global Telecommunications Conference—Globecom'99. pp. 1023-1027.*

* cited by examiner

Primary Examiner—Jason Chan
Assistant Examiner—Danny Wai Lun Leung
(74) Attorney, Agent, or Firm—Anderson Kill & Olick, PC

(57) ABSTRACT

A dynamic wavelength management in an optical burst switching system guarantees QoS by using wavelength resources effectively and using only a basic offset time for guaranteeing a specified blocking loss rate without incurring any additional delay. A control header packet and data having a plurality of wavelengths are fed to a core node asynchronously, and the control header packet is processed in a control plane, during which a wavelength group list is created corresponding to a number of classes and the respective group list is dynamically reconstructed corresponding to each QoS group.

4 Claims, 5 Drawing Sheets

DYNAMIC WAVELENGTH MANAGEMENT METHOD IN OBS NETWORKS

FIELD OF THE INVENTION

The present invention relates to a dynamic wavelength management method for use in an OBS(Optical Burst Switching) network; and, more particularly, to a dynamic wavelength management method that can guarantee QoS (Quality of Service) through an effective use of wavelength resources by way of utilizing only a basic offset time in guaranteeing a specified loss rate, without incurring any additional delay.

BACKGROUND OF THE INVENTION

Today's Internet is mainly focused on the QoS performance for differentiated services in large bandwidths to support various multimedia services. Recently, the IP(Internet Protocol) over WDM(Wavelength Division Multiplex) architecture (the so called optical Internet) has surfaced as a next generation Internet backbone because it eliminates processing overheads which such other architectures as ATM(Asynchronous Transfer Mode) and SONET(Synchronous Optical Network) generate. Although the optical Internet provides a huge bandwidth, certain schemes have to be introduced into the architecture to furnish missing QoS and fast fault recovery capabilities in optical level.

To support QoS in the Internet, various schemes have been developed. Integrated services (Intserv) provide the ability of delivering end-to-end QoS to applications over heterogeneous networks. Existing approaches for providing the Intserv require routers to manage per-flow states and perform per-flow operations (see, e.g., R. Braden et al., "Integrated services in the internet architecture: An overview." RFC 1633, June 1994). Meanwhile, differentiated services (Diffserv) propose scalable means to deliver IP QoS based on an aggregate traffic handling (see, e.g., S. Blake et al., "An architecture for differentiated services," RFC 2475, December 1998). Diffserv provides traffic differentiation by classifying traffic into a few classes, with relative service priorities assigned to them.

However, the above schemes require an electronic buffer and a logical processor to implement queuing algorithms. This requirement is not readily achievable for a WDM layer since optical RAM's have not been developed yet and optical processing technology is not mature enough to support the delicate processing.

Thus, in order to guarantee the network performance effectively in optical level, it is necessary to develop a new QoS scheme which should include the following characteristics:

In order to keep data transparency, data information should be processed in all optical manner, i.e., without E/O(Electrical to Optical) and O/E(Optical to Electrical) conversions at intermediate nodes;

The new QoS mechanism should guarantee the upper levels of blocking loss rate (or blocking probability) and end-to-end delay, i.e., not CoS(Class of Service) performance but QoS performance;

The new QoS scheme should be efficiently scalable, reliable and available at WDM networks; and From the hardware view point, the complexity should be minimized to reduce the processing time and the implementation cost.

It is expected that current optical circuit switching would eventually evolve into optical packet switching. However, as of today, optical component and processing technologies do not support the practical optical packet switching functions. In the meantime, therefore, OBS(Optical Burst Switching) is considered as a promising solution for IP over WDM networks in the near future(see, e.g., C. Qiao and M. Yoo, "Optical burst switching(OBS)—A new paradigm for an optical internet.", J. High Speed Network, vol.8, pp. 69–84, 1999). The OBS architecture may not require optical buffering at intermediate nodes and the adopted delay reservation scheme thereof increases the bandwidth utilization.

Along this line, an offset-time-based QoS scheme in an OBS network has been proposed(see, e.g., M. Yoo and c. Qiao, "QoS performance of optical burst switching in IP over WDM networks," IEEE J. Selected Areas in Communications, vol. 18, no. 10, pp. 2062–2071. October 2000). This scheme uses an extra offset time instead of buffering to isolate classes of traffic. This scheme effectively works without any buffering at intermediate nodes and is very simple to implement. Although this scheme is simple and efficiently isolates the classes of traffic, it has two limitations: First, it can isolate the classes of traffic but cannot guarantee a fixed level of QoS performance: that is, it provides not QoS but CoS. Second, a burst formed at an edge switch/router may include multiple IP packets with a several megabyte size. Therefore, there may occur a significantly large pre-transmission delay in QoS offset time based OBS networks (e.g., as long as a few ms order).

SUMMARY OF THE INVENTION

It is, therefore, a primary object of the present invention to provide a dynamic wavelength management method for use in an OBS network that can guarantee QoS through an effective use of wavelength resources by way of utilizing only a basic offset time in guaranteeing a specified blocking loss rate without incurring any additional delay.

In accordance with the present invention, there is provided a dynamic wavelength management method for use in an OBS network, wherein the OBS network comprises an OBS core node including at least one input port for inputting a control header packet and a plurality of input data carried in a plurality of wavelengths; at least one output port for outputting the control header packet and the input data; a control plane for processing the control header packet; and a data plane for processing the input data, the method comprising the steps of: a) creating an initial wavelength group list for each output port, the wavelength group list including plural number of QoS groups, wherein in the wavelength group list, available wavelengths for data of each output port are allocated to the QoS groups; b) finding an optimum output port corresponding to the control header packet; c) allocating a wavelength to each input data based on the wavelength group list; d) determining a scheduling result based on the allocation result in the step c); e) updating the wavelength group list for the optimum output port based on the scheduling result; and f) repeating said steps b) to e) for a next control header packet and its corresponding input data by using the updated wavelength group list previously obtained in the step e).

BRIEF DESCRIPTION OF THE DRAWINGS

The above and other objects and features of the present invention will become apparent from the following description of the preferred embodiment given in conjunction with the accompanying drawings, in which.

DETAILED DESCRIPTION OF THE PREFERRED EMBODIMENT

A new OBS-based QoS guaranteed performance scheme by using a dynamic wavelength management in accordance with the present invention will now be described in detail. The QoS scheme in accordance with the present invention uses a wavelength manager, which dynamically allocates wavelength resources among QoS groups for each output port based on the QoS requirement. DWM(Dynamic Wavelength Management)—based QoS scheme of the present invention does not entail any extra delay but provides a controlled upper limit of blocking loss rate for each QoS group.

Figure 1:
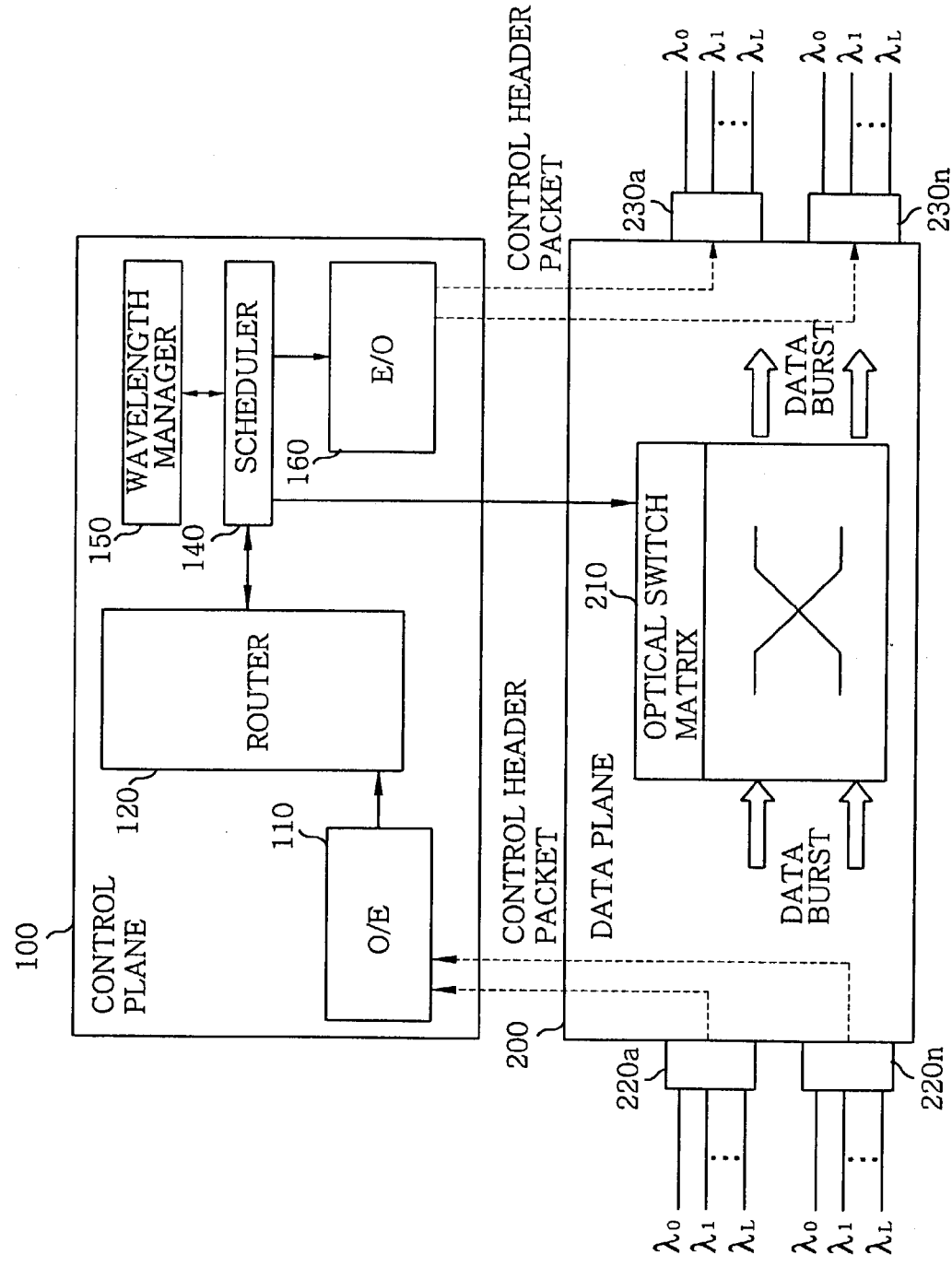
FIG. 1 depicts an architecture of an OBS core node of an OBS network in accordance with the preferred embodiment of the present invention.

FIG. 1 depicts the architecture of an OBS core node of an OBS network in accordance with the preferred embodiment of the present invention. The OBS core node includes a control plane 100 and a data plane 200. To put it in detail, the control plane 100 includes an O/E (optical to electrical) converter 110 for performing an O/E conversion of control header packets (CHPs), a router 120 for executing address lookup of a routing table to determine an optimum output port for each input CHP, a wavelength manager 150 for creating and reconfiguring a wavelength group list for each output port, a scheduler 140 for allocating an input data burst corresponding to the input CHP among available wavelength resources based on the wavelength group list for the optimum output port, and an E/O (electrical to optical) converter 160 for performing an E/O conversion of the CHP. Herein, a wavelength group list for each output port includes information representing wavelengths assigned to each QoS group of each output port, data of a class i belonging to a QoS group i. The data plane 200 includes an optical switch matrix 210 for switching the input data burst to proper wavelengths of the optimum output port under the control of the scheduler 140, and input ports 220a to 220n and output ports 230a to 230n, each port being provided with one wavelength $\lambda_0$ for control packets and L wavelengths $\lambda_1$ to $\lambda_L$ for data bursts.

CHPs arrive at the OBS core node asynchronously via control channels at $\lambda_0$ of the input ports 220a to 220n. The O/E converter 110 converts each optical CHP to an electrical CHP, which is outputted to the router 120.

The router 120 has a routing table for determining an optimum output port for the input CHP and the data burst(s) corresponding thereto. The optimum output port is determined, e.g., based on destination information in the input CHP. The router 120 delivers the electrical CHP and port data representing the optimum output port to the scheduler 140. The routing table can be updated based on scheduling information from the scheduler 140 representing a degree of data traffic in each output port.

The scheduler 140 selects first a wavelength group list for the optimum output port based on the port data from the router 120. The wavelength group list is provided by the wavelength manager 150 as will be described later. Thereafter, scheduler 140 looks up QoS parameter(s) in the CHP to search for a proper wavelength for each input data corresponding to the CHP based on various policies such as first fit or LAUC-VF (the latest available unused channel algorithm with void filling) ($j^{th}$ class data will be scheduled in one of the wavelengths for QoS group j of the selected wavelength group list).

The scheduler 140 transfers wavelength allocation data representing the optimum output port and designating a wavelength assigned to each input data to the optical switch matrix 210, so that the data burst(s) corresponding to the CHP is switched to the proper wavelengths of the optimum output port. Furthermore, the scheduler 140 creates a reconfigured electrical CHP, which is provided along with the port data to the E/O converter 160, reflecting wavelength allocation information of the output data burst(s). The scheduler 140 also provides the scheduling information to the router 120 for the update of the routing table therein.

After finishing the scheduling of the input data corresponding to the input CHP among the wavelengths of the optimum output port based on the previously obtained wavelength group list thereof, the scheduler 140 provides the wavelength manager 150 with a scheduling result. The scheduling result includes blocking loss rates and utilization data of wavelengths for each QoS group of the optimum output port.

The E/O converter 160 refers to the port data and converts the reconfigured electrical CHP to a reconfigured optical CHP, which is outputted to the control channel of the optimum output port.

The wavelength manager 150 creates an initial wavelength group list for each output port as follows: i.e., the available wavelengths for data of each output port are evenly allocated to N QoS groups. For instance, suppose the total number of data wavelengths, L, per an output port is 31 and N is 3, then the number of wavelengths allocated to QoS groups will be, e.g., 10, 10, 11 respectively. In particular, if L is a multiple of N, the total number of wavelengths associated with QoS groups in each output port is initially divided by N (the number of wavelengths per QoS group will be M=L/N). Each wavelength group list is then dynamically updated to meet the QoS requirements. Details of reconfiguring a wavelength group list is described hereinbelow.

Figure 2:
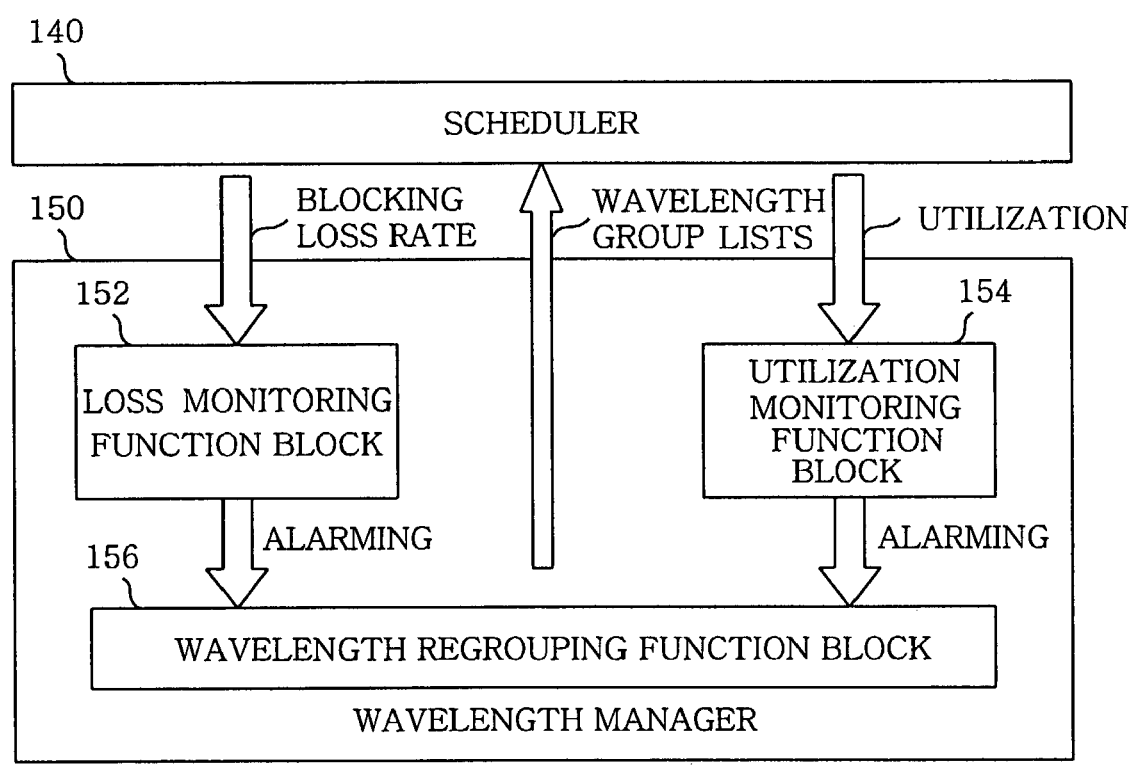
FIG. 2 shows a detailed block diagram of the wavelength manager 150 shown in FIG. 1.

FIG. 2 shows a functional block diagram of the wavelength manager 150. The wavelength manager 150 includes a loss monitoring function (LMF) block 152 for monitoring a blocking loss rate of each QoS group for the optimum output port, a utilization monitoring function (UMF) block 154 for monitoring the utilization of wavelengths of each QoS group for the optimum output port, and a wavelength regrouping function (WRF) block 156 for updating the wavelength group list for the optimum output port based on outputs from the LMF block 152 and the UMF block 154. The updated wavelength group list is stored in the wavelength manager 150 and used for scheduling input data corresponding to a next CHP for the optimum output port.

Details of operation of the wavelength manager 150 will be described below. The LMF block 152 and the UMF block 154 monitor the blocking loss rate and the utilization data for each QoS group for the optimum output port provided from the scheduler 140. If the LMF block 152 detects a blocking loss rate for a QoS group, which is larger than a predetermined loss rate for that QoS gorup, the LMF block 152 sends a loss alarm signal to the WRF block 156. And if the blocking loss rate is equal to or less than the predetermined loss rate, the LMF block 152 issues a loss safe signal to the WRF block 156.

Likewise, if the UMF block 154 detects utilization data for a QoS group to be greater than a predetermined utilization value for that QoS group (as the predetermined loss rate for a QoS group decreases, the predetermined utilization value thereof also decreases), the UMF block 154 sends a utilization alarm signal to the WRF block 156; and otherwise a utilization safe signal is provided from the UMF block 154 to the WRF block 156.

If the WRF block 156 senses two alarm signals for a certain QoS group, the QoS group may need more wavelengths to guarantee the QoS requirement; but if the WRF block 156 is provided with two safe signals for a QoS group, less wavelengths can be allocated to the QoS group.

A wavelength group list R(i−1) to be used to schedule or allocate the input data corresponding to an (i−1)th CHP for a given output port among data channels $\lambda_1 - \lambda_L$ thereof can be defined as:

$$R(i-1) = \left\{ [w_0, w_1, \ldots, w_{N-1}] \middle| 1 \leq W_0, W_1, \ldots, W_{N-1} \leq L - N + 1, \sum_{k=0}^{N-1} W_k = L \right\} \quad \text{Eq. (1)}$$

wherein i is a positive integer greater than 1; $w_k$ is a set of wavelengths included in the k-th QoS group of a given output port; and $W_k$ is the number of wavelengths allocated to the k-th QoS group. Each QoS group $w_k$ has to include at least one wavelength.

The set B(i−1) of blocking loss rates and the set U(i−1) of utilization data for the QoS groups of a given output port, which are provided by the scheduler 140 after scheduling the input data corresponding to the (i−1)th CHP based on R(i−1), can be defined as:

$$B(i-1) = \{[b_0, b_1, \ldots, b_{N-1}] | 0 \leq b_0, b_1, \ldots, b_{N-1} \leq 1\} \quad \text{Eq. (2)}$$

and $$U(i-1) = \{[u_0, u_1, \ldots, u_{N-1}] | 0 \leq u_0, u_1, \ldots, u_{N-1} \leq 1\} \quad \text{Eq. (3)}$$

wherein $b_k$ and $u_k$ are the blocking loss rate and the utilization data for the QoS group $w_k$, respectively.

Further, the set G of predetermined loss rates and the set F of preset utilization data for the QoS groups for each output port can be defined as:

$$G = \{[g_0, g_1, \ldots, g_{N-1}] | 0 \leq g_0, g_1, \ldots, g_{N-1} \leq 1\} \quad \text{Eq. (4)}$$

and $$F = \{[f_0, f_1, \ldots, f_{N-1}] | 0 \leq f_0, f_1, \ldots, f_{N-1} \leq 1\} \quad \text{Eq. (5)}$$

wherein $g_k$ and $f_k$ are the predetermined loss rate and the preset utilization data for the QoS group $w_k$, respectively.

The DWM-based QoS guaranteeing scheme of the invention operates by performing the following steps (a) to (e):

(a) Comparing $[b_0, b_1, \ldots, b_{N-1}]$ in B(i−1) with $[g_0, g_1, \ldots, g_{N-1}]$ in G. And if $b_k > g_k$, the LMF block 152 sends the loss alarm signal to the WRF block 156. Otherwise, the LMF block 152 sends the loss safe signal to the WRF block 156.

(b) Comparing $[u_0, u_1, \ldots, u_{N-1}]$ in U(i−1) with $[f_0, f_1, \ldots m f_{N-1}]$ in F. And if $u_k > f_k$, the UMF block 154 sends the utilization alarm signal to the WRF block 156. Otherwise, the UMF block 154 sends the utilization safe signal to the WRF block 156.

(c) If the WRF block 156 receives two alarm signals for the k-th QoS group, the WRF block 156 searches for $w_p$ and sets $w_k = w_k \cup w_p^l$, $w_p = w_p - w_p^l$, wherein $w_p$ represents a set of wavelengths included in a p-th QoS group, the p-th QoS group is one of the QoS groups which do not have two alarm signals simultaneously, and $w_p^l$ represents l-th wavelength in QoS group p. After update, $w_p$ should have at least one wavelength.

(d) If the WRF block 156 receives two safe alarm signals for the k-th group having more than one wavelength, the WRF block 156 searches for $w_q$ and sets $w_k = w_k - w_k^a$, $w_q = w_q \cup w_k^a$, wherein $w_k^a$ represents an a-th wavelength in the k-th QoS group. $w_q$ represents a set of wavelengths included in a q-th QoS group, and the q-th QoS group is one of the QoS groups which do not have two safe signals simultaneously.

(e) Updating R(i). If the value is not changed, R(i) =R(i−1) and R(i) is sent to the scheduler 140. R (i) is employed in scheduling input data corresponding to an i-th CHP for the given output port.

The above-mentioned steps (a) to (e) of the DWM scheme are executed at the WRF block 156.

In accordance with the present invention, the length of wavelength scheduling time is reduced, since the scheduler 140 performs a wavelength search in a specific group, rather than searching through all wavelengths in optical fibers, based on a pre-prepared wavelength group list. Therefore, the required blocking loss rates can be guaranteed without incurring any additional delay.

The above-mentioned DWM algorithm has been simulated by using an OBS simulator made of 7 java classes: Among the 7 java classes, three classes are used for making one exponentially distributed bursts, i.e., two uniformly distributed destinations and QoS information. The other four classes are used for OBS burst generation, implementing the scheduler 140, the wavelength manager 150 and main classes.

It is assumed that a node has 8×8 ports and the priority of QoS defines three classes such as class 0, class 1, class 2. Class 0 is a class having the highest priority and class 2 is a class having the lowest one. The scheduling mechanism for the data burst adopts a void filling scheme where only 10 void information can be stored in the scheduler 140. After the simulation, it is found that the 10 void information is enough for each channel. The traffic is composed of class 0, class 1 and class 2 which are distributed with proportions of 20%, 30% and 50%, respectively. Table 1 shows the simulation parameters.

TABLE 1

| |
| --- |
| Data burst transmission rate, R = 10 Gbps |
| Control packet transmission rate, r = 10 Gbps |
| Number of data channels, K = 31 |
| Number of control channel, k = 1 |
| Load provided, ρ = 0.8 |

In order to decide the data burst length, the following constraints should be considered: The minimum burst length can be determined by several ways. Let $L_b$ be the average data burst length (in time unit) and $L_h$ be the average control header packet length (in time unit). First, the maximum average CHP transmission rate ($k/L_h$) has to be larger than the maximum average data transmission rate ($K/L_b$). Then, the minimum data burst length is defined as $L_b \geq K \cdot L_h/k$. Second, average burst arrival rate λ has to be smaller than the control unit's service rate. Therefore the minimum burst length is determined by $L_b = \rho \cdot K/\pi$, wherein ρ represents the saturation probability of data burst fed to the OBS core node, so that when the value of ρ is 0.8, it is meant that 80% of the maximum capacity of the data burst is used. Third, technological limit has to be considered. For example, the switching time of the promising MEMS (Microelectromechanical System) switch is in several ms order. Therefore it affects the guard period θ of data bursts. Let θ=1 ms, in order to obtain 0.7 channel utilization frequency, $(L_b-1)/L_b=0.7$, or $L_b=3.3$ ms. Based on the above constraints, it is decided that the data burst length of 2 ms for 20 μs offset time and of 4 ms for 40 μs offset time.

Since no buffer is used, the loss probability of classless OBS protocol that can be modeled M/M/m/m systems, commonly called Erlang's B formula, denoted by B(k, ρ), where m=ρ·k, can be analyzed as:

$$B(k, \rho) = \frac{m^k/k!}{\sum_{n=0}^{k} m^n/n!}$$

Figure 3:
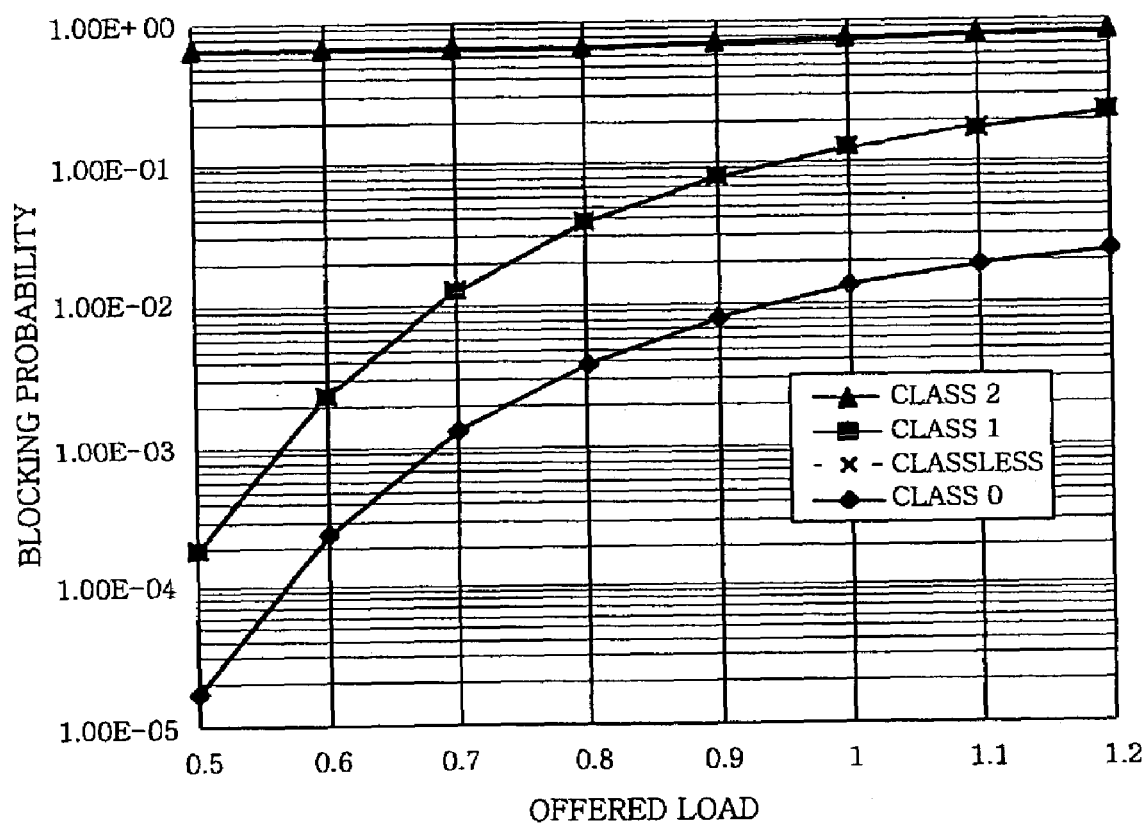
FIG. 3 offers an average blocking probability of each QoS class as a function of an offered load.

FIG. 3 shows an average blocking probability of each QoS class as a function of the offered load when 32 wavelengths per port are used. The desired blocking loss rate of class 0 group is set as $10^{-1}$ lower than the classless OBS, class 1 group is the same as classless OBS, and class 2 is the best effort service. The blocking probability of classless OBS obtained from Erlang's B formula (dotted line) and obtained from simulation (class 1 line) are very similar, which shows the inventive OBS simulator performs reliably. As can be observed by comparing the blocking probability between class 0 group and class 1 group, service differentiation can be obtained by taking advantage of the DWM algorithm. The class 0 group has achieved exactly a $10^{-1}$ lower blocking probability than that of class 1. However, due to the price paid for the low blocking probability of class 0 group, the class 2 group has a higher blocking probability than the classless case. This implies that the conservation law holds true. Thus we can regard the classless blocking probability to be the same as the average blocking probability of the entire QoS groups.

Figure 4:
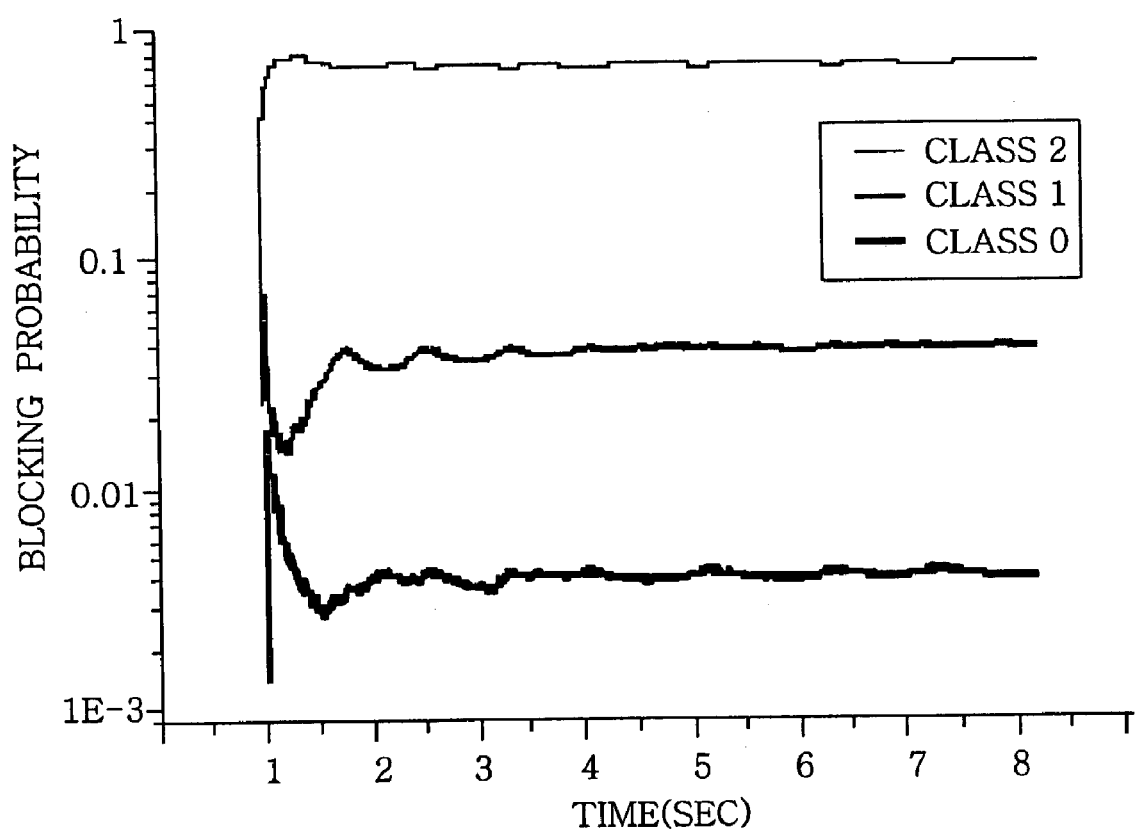
FIG. 4 provides a blocking probability of each QoS class as a function of time.

FIG. 4 shows the blocking probability of individual QoS group as a function of the operating time when 32 wavelengths per port are used. Class 0 and 1 groups guarantee the desired blocking probability during the operating time. Specifically, QoS 0 guarantees the desired blocking loss rate after some settling time. This transient period can exist to search for the number of optimum wavelengths per group because initially the QoS group was divided equally.

Figure 5:
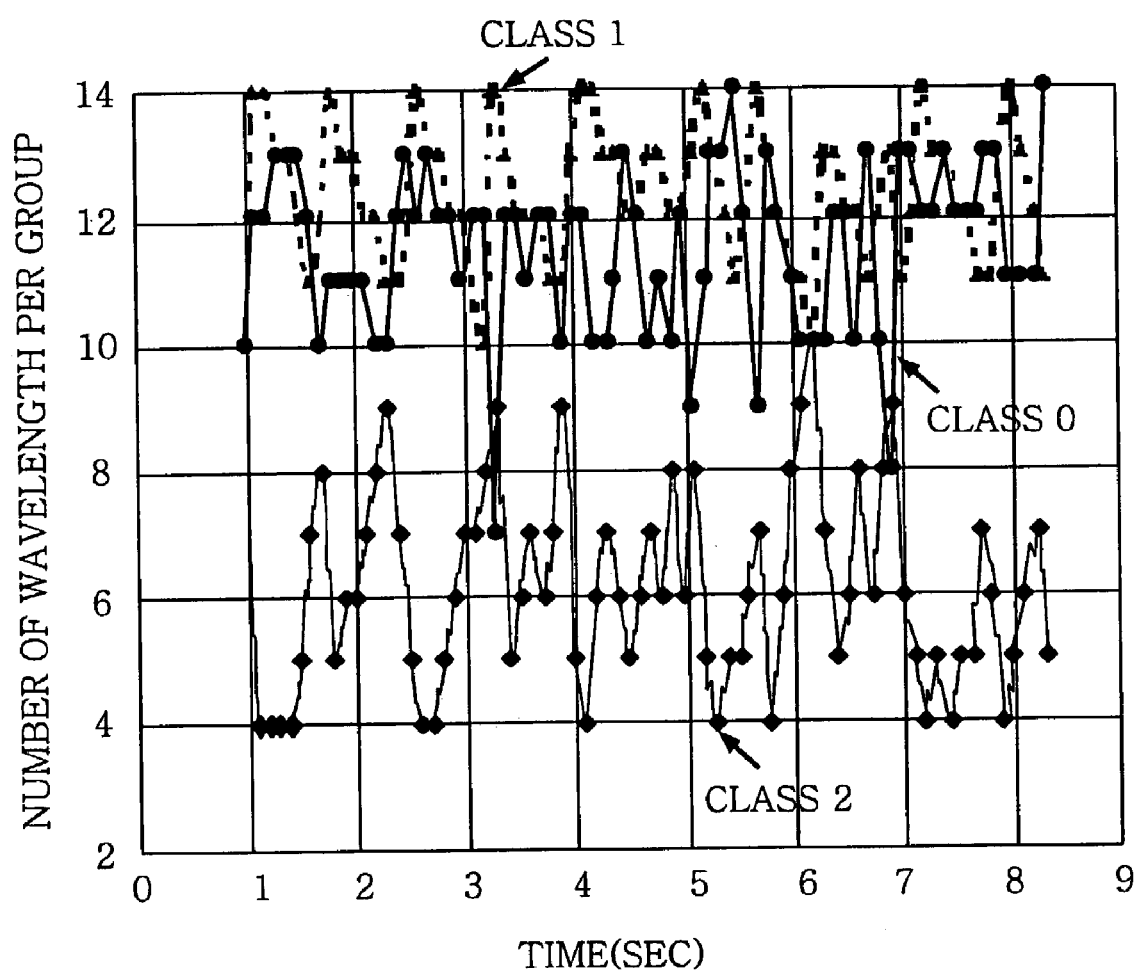
FIG. 5 exemplifies the number of wavelengths per each QoS class versus time.

FIG. 5 exemplarily shows the number of wavelengths per each QoS class versus time. The QoS 0 and 1 groups minimally use the number of wavelengths while guaranteeing the desired blocking loss rate. As can be seen, the QoS 0 group only uses 11 or 13 wavelengths to guarantee the performance. In this simulation, it is found that the variation of the wavelength number is increased as the desired loss rate is getting smaller. To compensate this variation, reconfiguration is needed in such a way that the preset utilization data of the UMF block 154 and blocking monitoring interval of the LMF block 152 are set to be smaller than before because these can react sensitively for guaranteeing a lower blocking loss rate.

While the invention has been shown and described with respect to the preferred embodiments, it will be understood by those skilled in the art that various changes and modifications may be made without departing from the spirit and the scope of the invention as defined in the following claims.

What is claimed is:

1. A dynamic wavelength management method for use in an OBS (Optical Burst Switching) network, wherein the OBS network comprises an OBS core node including at least one input port for inputting a control header packet and a plurality of input data carried in a plurality of wavelengths; a plurality of output ports for outputting the control header packet and the input data; a control plane for processing the control header packet; and a data plane for processing the input data, the method comprising the steps of:

a) creating an initial wavelength group list for each output port, the wavelength group list including plural number of Quality of Service (QoS) groups, wherein in the wavelength group list, available wavelengths for data of each output port are allocated to the QoS groups;

b) finding an optimum output port corresponding to the control header packet;

c) allocating a wavelength to each input data based on the wavelength group list;

d) determining a scheduling result based on the allocation result in the step c);

e) updating the wavelength group list for the optimum output port based on the scheduling result; and f) repeating said steps b) to e) for a next control header packet and its corresponding input data by using the updated wavelength group list previously obtained in the step e) wherein scheduling result includes a blocking loss rate and utilization data for each QoS group.

2. The dynamic wavelength management method of claim 1, wherein each of the QoS groups is allocated with more wavelengths to guarantee the QoS requirement, in case the blocking loss rate and the utilization data for the QoS group are greater than a predetermined loss rate and preset utilization data for the QOS groups, respectively.

3. The dynamic wavelength management method of claim 1, wherein each of the QOS groups is allocated with less wavelengths, in case the blocking loss rate and utilization data for the QoS group are equal to or less than a predetermined loss rate and preset utilization data for the QoS groups, respectively.

4. The dynamic wavelength management method of claim 1, wherein at least one wavelength is allocated to each QoS group in the initial and the updated wavelength group list.

* * * * *